March 26, 1957  K. RESCHENEDER  2,786,697
PRESSURE SEALED FLEXIBLE PIPE COUPLING
Filed Jan. 5, 1953
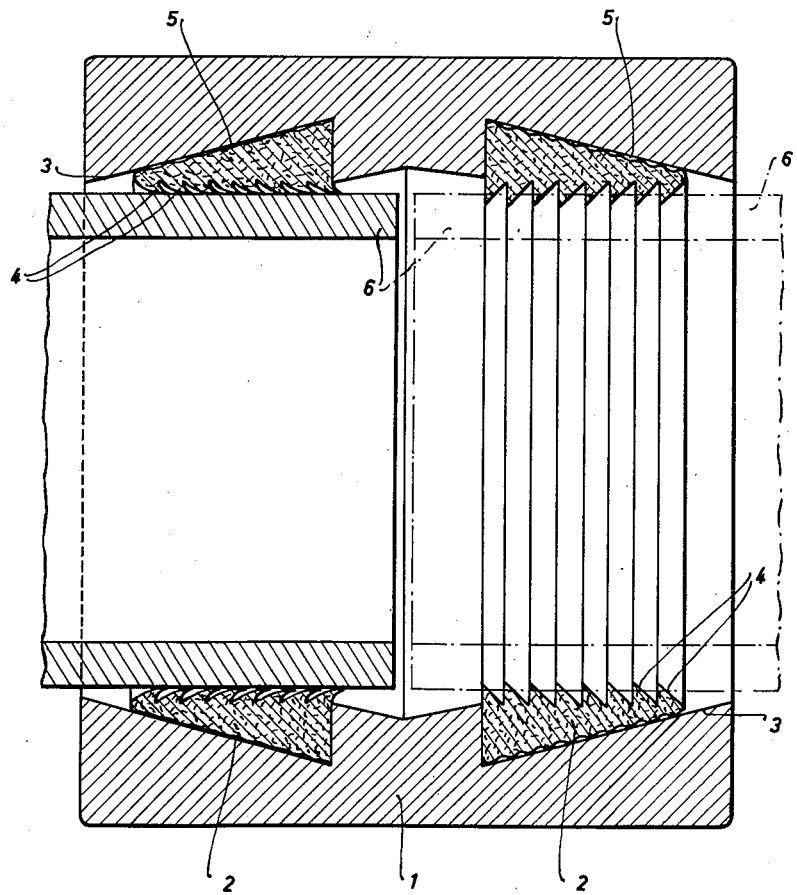
INVENTOR.
K. Rescheneder
BY
ATTYS.

United States Patent Office 2,786,697
Patented Mar. 26, 1957

2,786,697
PRESSURE SEALED FLEXIBLE PIPE COUPLING

Karl Rescheneder, Vocklabruck, Austria, assignor to Eternit-Werke Ludwig Hatschek, Vocklabruck, Austria, a corporation of Austria Application January 5, 1953, Serial No. 329,525
Claims priority, application Austria January 17, 1952

1 Claim. (Cl. 285—110)

The invention relates to a pipe coupling in which at least one packing ring or yieldable material is arranged between the pipe and a socket surrounding the latter.

Pipe couplings of this type are known in which the packing ring or rings are pressed on to the pipe or the socket by the pressure obtaining in the pipe line, so that the packing action is automatically increased when this pressure increases. However, such pipe couplings have generally not proved satisfactory in practice, since the packing action at low pressures in the pipe line, for example, when this is being filled, is defective. However, at relatively high pressures, such pipe couplings are not always entirely satisfactory, since the tightness is deleteriously affected by foreign bodies, such as sand or the like, which are lodged against the packing rings, or by irregularities in the surfaces of the pipes or sockets. A further defect of known pipe couplings of the said type frequently consists in that they can only be fitted with difficulty and perhaps only by using special tools.

The invention has for its object to provide a pipe coupling, more especially for conduits under pressure, for example, water pipes, which ensures a complete sealing action under all circumstances. A further object of the invention is to provide a pipe coupling which can be manufactured easily and inexpensively and which can be assembled conveniently, quickly and without special tools.

A pipe coupling according to the invention comprises a socket which encloses at least one pipe and which has at least one internal surface tapering towards one end of the socket, and at least one packing ring whose external surface bears on the said internal surface and has internal circumferential ribs, the internal diameter of which is smaller than the external diameter of the pipe.

One embodiment of the invention is illustrated by way of example in the accompanying drawing, which is a longitudinal sectional elevation of one form thereof.

The pipe connection or pipe coupling comprises a socket and two elastic packing rings 2 of rubber or the like, which are each mounted in a recess in the socket 1, said recess having a conical internal surface 3. As will be seen from the drawing, the conical surfaces 3 are tapered towards the ends of the socket. Each packing ring 2 has a corresponding conical cross-section and is formed internally with circumferential ribs 4, which have substantially saw-toothed cross-section each rib sloping towards the end of the socket, and externally with shallow circumferential corrugations 5. The internal diameter of the ribs 4 is somewhat smaller than the external diameter of the pipe 6, which is indicated both in broken lines on one side to show the packing ring undeformed, and in full line to show the packing ring when the pipe is in place in the socket.

When the pipes 6 are introduced into the socket 1, in which the packing rings 2 have been inserted beforehand, the ribs 4 are displaced from the position shown towards the centre of the socket, so that they form a kind of sleeve enclosing the pipes with a good packing action. At the same time, the packing rings 2 are slightly expanded, so that they are forced against the conical surfaces 3. It will be seen that each packing ring does not bear on the surfaces 3 along its entire external surface, but merely at the encircling peaks of the corrugations. These projecting peaks are more easily deformed and are therefore better adapted to any irregularities in the surfaces 3, so that a better packing action is produced than with a smooth conical surface. The same applies as regards the action of the inner ribs 4 as compared with a smooth cylindrical surface. Since several ribs or corrugations are arranged one after the other, any foreign bodies which are lodged between the rings 2 on the one hand and the pipes 6 or the socket 1 on the other hand are not able deleteriously to affect the packing action.

If the pressure in the pipes increases, the packing rings 2 are forced against the socket and are accordingly progressively compressed by the conical surfaces, so that the packing action is strengthened. It can be seen that the pipe coupling according to the invention, and also its assembly, are characterized by its particular simplicity, the fitting being accomplished by pushing the pipes into the socket and not requiring any kind of auxiliary device or special tools.

The invention is also adapted to be used for connections of socket pipes, in which case the socket into which one of the two pipes is pushed, is in one piece with the other pipe and only a single packing ring is employed. The cross-section of the ribs 4 may differ from the shape shown in the example illustrated. The corrugations 5 may in certain cases be omitted, that is to say, the outer conical surface of the packing rings 2 can also be made smooth.

The coupling in accordance with the invention can be employed with pipe lines of metal, asbestos cement or other materials, and the socket 1 can also be made of various materials in view of its simple shape.

What I claim is:

A pipe coupling for a pipe carrying fluid under pressure comprising an integral socket, a pipe end of a diameter to fit into the internal diameter of said socket, an annular groove of triangular section in the interior surface of said socket surrounding said pipe end, said annular groove being bounded by a radial surface adjacent the end of the pipe and a conical surface extending along the direction of the pipe from the radial surface and from the pipe end, the angle of said conical surface to said pipe being approximately 15°, a packing ring of generally the same triangular section as said annular groove and having a generally cylindrical inner surface extending radially inward beyond said radial surface, said inner surface being provided with a plurality of identical annular ribs of triangular section each having a radial side toward the larger end of the packing ring and a sloping side connecting the top of the radial side with the root of the radial side of the next adjacent rib, the outer conical surface of said packing ring being formed with a plurality of shallow annular corrugations, said packing ring being of such size as to normally snugly contact the surfaces of said annular groove and the inner surface being of such a diameter that upon insertion of a pipe end thereinto the said annular ribs are deformed and the packing ring expanded into tight engagement with said groove surfaces whereby increasing fluid pressure within said pipe presses against the radial surface of said packing ring to press said packing ring axially of said pipe against said conical surface to increase the sealing effect of said coupling by wedging said sealing ring between said pipe and said conical surface.

References Cited in the file of this patent

UNITED STATES PATENTS

| | | |
|---|---|---|
| 556,215 | Schmidt | Mar. 10, 1896 |
| 906,849 | Baashuus | Dec. 15, 1908 |
| 1,508,026 | Noble | Sept. 9, 1924 |
| 2,021,745 | Pfefferle et al. | Nov. 19, 1935 |
| 2,032,492 | Nathan | Mar. 3, 1936 |
| 2,245,154 | McWane | June 10, 1941 |